United States Patent [19]

Diehn et al.

[11] Patent Number: 4,719,991
[45] Date of Patent: Jan. 19, 1988

[54] LUBRICANT DISTRIBUTION SYSTEM WITH HOSE MOUNT

[75] Inventors: Philip H. Diehn, Ashville, N.C.; Timothy P. Dunigan, Jr., Lansdale, Pa.

[73] Assignee: Prestolite Wire Corporation, Farmington Hills, Mich.

[21] Appl. No.: 917,857

[22] Filed: Oct. 14, 1986

[51] Int. Cl.$^4$ .............................................. F01M 11/00
[52] U.S. Cl. ...................... 184/6.28; 248/89; 248/650; 137/355.26; 220/85 S; 220/85 P; 417/572; 239/195; 222/74
[58] Field of Search .......................... 184/6.28, 105.3; 220/530, 74; 239/195, 197, 198, 199; 248/89, 75, 79, 80, 650, 656; 137/355.12, 355.19, 355.26; 242/86; 141/382, 389; 220/85 S, 85 R, 85 P; 417/234, 572

[56] References Cited

U.S. PATENT DOCUMENTS

| | | | |
|---|---|---|---|
| 1,394,631 | 10/1921 | Luschka | 248/650 |
| 1,511,336 | 10/1924 | Hoey | 248/656 |
| 1,614,068 | 1/1927 | Kelsea | 248/274 |
| 1,619,455 | 3/1927 | Zerk | 184/105.3 |
| 1,896,740 | 2/1933 | Cosseboom | 248/214 |
| 2,080,460 | 5/1937 | Churchill | 248/214 |
| 2,150,025 | 3/1939 | Cook | 222/74 |
| 2,305,293 | 12/1942 | Kuppenbender et al. | 354/147 |
| 2,397,267 | 3/1946 | Jauch | 239/197 |
| 2,668,744 | 2/1954 | Cockrell | 248/205.1 |
| 2,757,958 | 8/1956 | Bussey et al. | 239/127 |
| 2,777,610 | 1/1957 | Fox | 222/530 |
| 3,329,381 | 7/1967 | Moore | 248/89 |
| 3,361,404 | 1/1968 | Lohr | 248/206.5 |
| 3,491,975 | 1/1970 | Weaver | 33/245 |
| 3,492,769 | 2/1970 | Olson | 52/110 |
| 3,734,438 | 5/1973 | Kautz | 211/107 |
| 3,972,387 | 8/1976 | Braun | 184/105.3 |
| 4,009,800 | 3/1977 | Loy | 222/530 |
| 4,037,690 | 7/1977 | Fisher et al. | 188/181 R |
| 4,290,584 | 9/1981 | Eckels et al. | 254/380 |
| 4,480,718 | 11/1984 | Marinelli | 184/105.3 |
| 4,506,853 | 3/1985 | Cathey | 248/79 |

FOREIGN PATENT DOCUMENTS

1089655  9/1960  Fed. Rep. of Germany ........ 222/74

Primary Examiner—Carlton R. Croyle
Assistant Examiner—Jane Obee
Attorney, Agent, or Firm—Wood, Herron & Evans

[57] ABSTRACT

A lubricant distribution system which includes a standard oil storage tank, a pump, a retractable hose reel for discharging the lubricant, and a saddle bracket for mounting the reel to the covered upper surface of the tank. The bracket is configured to facilitate attachment of the reel to a lubricant containing tank in an operative system by connecting to the tank at the ventilation cap fitting of the tank, and to be supported and leveled upon the tank with adjustable feet.

12 Claims, 2 Drawing Figures

LUBRICANT DISTRIBUTION SYSTEM WITH HOSE MOUNT

The present invention relates to lubricant distribution systems, and more partiuclarly to lubricant distribution systems which include as a lubricant reservoir a conventional oil tank and which operate to distribute lubricant by pumping it from the oil tank through a retractable hose.

Currently, there are in widespread use lubricant distribution systems with which oil or other lubrication products are distributed from conventional oil storage tanks. The conventional tanks are commonly standard 275 or 550-gallon storage tanks having a fairly typical shape, usually that of horizontally oriented cylinder of circular or elongated circular cross section having a rounded and usually semicircular top and bottom. These tanks are also normally equipped with at least two fittings, one for connection of a discharge line, and another necessarily situated on the top of the tank, for attachment of a ventilation cap.

There is a demand for equipping such systems so that the lubricant may be pumped from the tank and convenientlly distributed to various locations within proximity of the tank. This requires providing the tank with a discharge pump connected in line with its outlet fitting and a distribution hose connected to the outlet of the pump. In many cases where such a demand exists, providing these features will call for equipping a functioning oil storage tank in an existing and operative system with a discharge hose, and retaining the hose supporting and storage assembly at the lubricant storage tank.

It is the primary objective of the present invention to provide a lubricant distribution system with a lubricant discharge hose attached to the outlet of the pump and carried by a retractable hose reel. It is a more specific objective of the present invention to provide such a system adding a retractable hose reel in which the hose reel is secured to and mounted upon the oil storage tank, and more particularly to so provide such a tank-mounted retractable hose reel in such a distribution system in a form in which a system can be assembled around an existing lubrication distribution system or upon an existing and operative oil storage tank.

In mounting a hose reel upon a standard oil storage tank, particularly if the reel is to be mounted to the top of the tank, geometrical incompatability is usually encountered between the mounting base of the retractable hose reel assembly and the curved upper surface of the oil storage tank. According to one objective of the present invention, the system is provided with a reel mounting saddle which is adapted to be secured to the planar base of the retractable hose reel and to straddle and stand upon the curved upper surface of the oil storage tank so as to provide a firm and stable support for the hose reel on the top of the storage tank.

The mounting of a reel or reel supporting bracket to an oil storage tank could ordinarily be accomplished by welding or bolting it to the tank. Such methods of attachment characteristically require welding upon the tank surface or drilling of the surface of the tank. Such operations are capable of being performed when a tank is clean and dry, a condition which exists when the system is yet new and unused, but seldom thereafter. Lubricants contained within the tank and used for such a system are typically volatile liquids and often liquids which are flammable, and occasionally explosive when brought into contact with heat, sparks or flame.

Accordingly, it is a more particular objective of the present invention to provide a lubricant distribution system in which a retractable hose reel is mounted upon a conventional oil storage tank, and which can be fitted and mounted to the tank in an existing and operative lubrication distribution system without the need for drilling or welding directly on the tank wall, thus providing a system which can be assembled through safe and nonhazardous assembly procedures.

According to the more specific objectives of the present invention, a hose reel supporting saddle is provided in the system so that a hose reel can be mounted upon an oil storage tank and securely held thereto by attachment at the fitting of one of the preexisting fittings in the top of the tank, particularly, to the ventilation cap attachment fitting. In the illustrated embodiment of the present invention, a reel attachment saddle is provided with a horizontal cross member or platform having formed in it a hole specifically adapted to surround the pipe nipple of a conventional ventilation cap fitting so that, when a mating ventilation cap is threaded onto the pipe nipple of the ventilation cap fitting, the saddle and reel assembly are secured to the tank without welding, drilling, or other operation which might cause ignition of a lubrication product stored within the tank. As such, it is a particular advantage of the present invention that the system can be assembled while the tank contains lubricant.

It is a further objective of the present invention to provide such a system and specifically a hose reel attachment saddle mounting bracket therefor which will be capable of supporting a retractable hose reel on the top of an oil storage tank of any one of general various sizes and curvatures, and to support it in a stable and level position.

The above objectives are accomplished in the preferred embodiment of the present invention illustrated in the drawing and described below. In this embodiment, the system is provided with a retractable hose supporting saddle bracket having a general U-shaped design which includes a generally horizontal central web or platform portion having near its center a mounting hole for attachment to the ventilation cap fitting customarily found on the top of the oil storage tank. The platform has, extending upwardly at the ends thereof, planar supports for supporting and connecting to the usually flat base of the retractable hose assembly. In addition, the saddle bracket is provided with feet which extend downwardly from the ends of the platform beneath the hose reel support arms and configured to rest securely against and stand upon the curved surface of the tank. These feet are made adjustable so that the platform which supports the reel can be leveled.

These and other objectives and advantages of the present invention will be more readily apparent from the following detailed description of the drawings illustrating the preferred embodiment of a lubricant distribution system and hose reel mounting brackets therefore according to the principles of the present invention:

Figure 1:
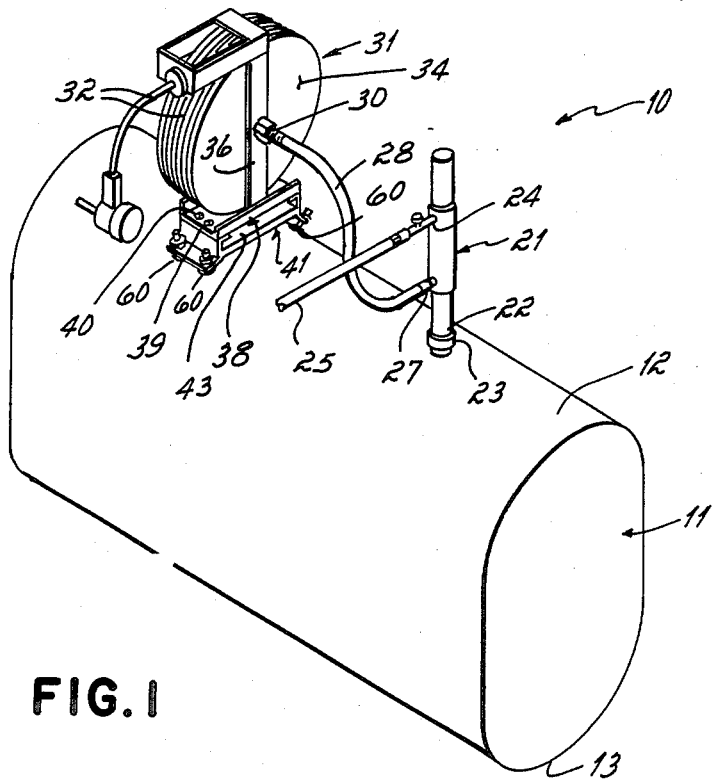
FIG. 1 is a perspective view of a lubricant distribution system embodying principles of the present invention.

Referring to FIG. 1, a lubricant distribution system 10, according to the preferred embodiment of the present invention, is illustrated. The system 10 includes a standard oil storage tank 11 in the form of a horizontally oriented cylindrical container. The tank 11 is of a standard shape for such tanks which are most often of standard 275 or 550-gallon capacity. The tank 11 has a semi-circulaar upper surface 12 and a semi-circular lower surface 13.

Attached to the top of the tank 11 is a pump 21 for drawing the lubricant from the tank 11. The pump 21, while it may be one of several types of pumps suitable for this purpose, is in the embodiment shown an air-driven reciprocating pump. The pump 21 has an inlet fitting 22 connected to a threaded pipe fitting 23 in the curved upper surface 12 of the tank 11 so as to make a fluid-tight connection at the pump inlet 22. Within the tank 11, the inlet 22 will communicate with the liquid lubricant within the tank 11 below the surface of lubricant and usually near the bottom of the tank 11. The pump 21 is further provided with an air inlet 24. A source of pressurized air (not shown) communicated to the air inlet 24 of the pump 21 through a pneumatic hose 25, connected between the compressed air source and the air inlet 24 from the air source. The pump 21 is provided further with a lubricating fluid outlet 27 to which is connected one end of an outlet hose 28. The outlet hose 38 is further connected at its other end to the inlet 30 of a hose reel assembly 31 on which is retractably wound a retractable lubricant distribution hose 32. The hose reel 31 includes a reel or spool portion 34 which is rotatably mounted on a reel support frame 36. The bracket 36 is rigidly attached to and supported upon a hose reel base 38. The base 38 presents a flat horizontal lower surface 39 having formed therein two pair of bolt holes 40 so that the reel base 38 and hose reel assembly 31 may be supported on and secured to a stable horizontal support surface.

The hose reel assembly 31 is mounted upon a saddle bracket 41 which is firmly attached to the upper surface 12 of the tank 11. The details and matter of attachment of the bracket 41 to the reel base 38 and to the curved upper surface of the tank 12 is better shown by reference to FIG. 2.

Figure 2:
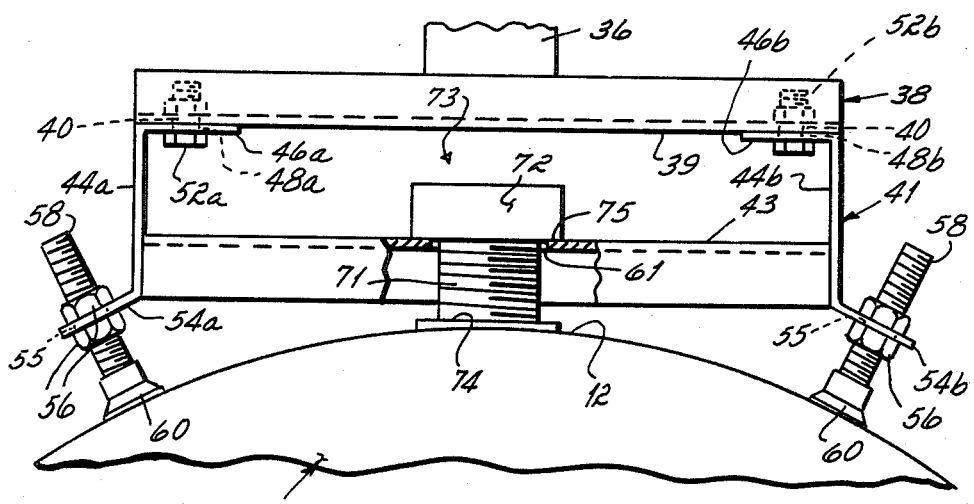
FIG. 2 is an elevational view of a section of the system of FIG. 1 viewing the reel supporting mounting bracket or saddle in a longitudinal direction along the top of the oil storage tank.

Referring to FIG. 2, the curved upper surface 12 of the oil storage tank 11 is shown. Situated on top of the surface 12 is the saddle bracket 41 which is attached to the tank in a manner further described below. The saddle bracket 41 supports and is attached to the base 38 of the reel assembly 31, with the frame 36 rigidly attached to the base 38 extending upwardly therefrom.

The saddle bracket 41 includes a horizontal platform section 43 and a pair of upstanding arms 44a and 44brigidly attached at the opposite ends of the platform 43. The arms 44 have at the upper ends thereof horizontal support surfaces 46a and 46b formed integrally on the arms 44a and 44b, respectively, and each having drilling therein a pair of bolt holes 48a and 48b, respectively. The holes 48 are so spaced as to align with the bolt holes 40 in the base 38 of the reel assembly 31. Supported on the saddle 41 and securely bolted to these upper surfaces 46 is the base 38 of the reel support 31. This base 38 is secured to the surfaces 46a and 46b by two pair of bolts 52a and 52b, respectively. The saddle bracket 41 so described is, in cross section, generally U-shaped as can be seen from FIG. 2, with the platform 43 and the arms 44 defining the shape of a U.

At each end of the platform 43 of the saddle bracket 41 and formed integrally on the arms 44a and 44b, respectively, are a pair of foot support brackets 54a and 54b, respectively. Each of the brackets 54 has thereon a pair of holes 55. Through each hole of the pairs of holes 55 in the brackets 54a and 54b and locked thereto by lock nuts 56 is a leg 58 formed of a threaded rod. Each of the legs 58 has rotatably attached at the lower end thereof one of a set of four feet 60. The feet 60 are so formed as to solidly reset against the upper curved surface 12 of the tank 11 to support the saddle 41. The rods forming the legs 58 are threaded so as to be longitudinally adjustable so as to vary the length of the legs 58 such that the distance between the brackets 54 and the feet 60 can be set to level the platform 43 and bring the feet 60 into firm contact with the surface 12 of the tank 11.

At the center of the platform 43 is a mounting hole 61. The hole 61 is dimensioned so as to fit over and around a pipe nipple 71 of a conventional ventilation cap fitting 73 in the upper surface 12 of the oil storage tank 11. As illustrated in FIG. 2, the conventional pipe fitting 73 comprises an internally threaded pipe port 74 welded or otherwise fixedly secured in a hole in the top of the tank 11. A pipe nipple 71 is threaded into the pipe port 74 and a ventilation cap 72 is threaded into the top of the pipe nipples 71. This conventional ventilation cap fitting 73 is situated on the top center line of the curved upper surface 12 of the track 11.

The conventional ventilation cap 72, when threaded onto the fitting 71 and over the platform 43, has a lower shoulder 75 which engages the top surface of the platform 73 and secures the platform 43 onto the ventilation cap fitting nipple 71 when the platform 43 is positioned over the nipple 71 with the nipple extending through the mounting hole 61 in the platform 43. When the ventilation cap 72 is tightened against the platform 43, it compresses the saddle bracket 41 against the upper surface 12 of the tank 11 at the contact points of the feet 60 with the tank surface 12.

The mounting of the bracket 41 can be accomplished while the distribution system 10 is operative or while the tank 11 otherwise contains lubricants which may be of a volatile or flammable type. This is simply accomplished by removing the cap 72 of the fitting 73 from the pipe nipple 71 of the fitting and placing the hole 61 of the saddle bracket 41 over the nipple 71. The feet 60 are then adjusted so as to level the platform 43 of the bracket. Thereafter, the ventilation cap is simply replaced onto the pipe nipple 71.

The saddle bracket 41 by providing a means for attachment to an existing ventilation cap fitting 73 in the upper surface 12 of a conventional tank 11, is thus capable of mounting the reel 31 to the curved upper surface 12 of the tank 11 without the need for drilling or welding on the tank 11. Accordingly, the dangerous or hazardous condition which could be caused by such operations is not present in configuring an existing distribution system in accordance with the principles of the present invention.

Having fully described the invention, the following is what is claimed:

1. A lubricant distribution system comprising:
   a conventional oil storage tank having a curved upper surface,
   a pump for withdrawing lubricant from said tank, a retractable hose reel having a hose connected to the outlet of said pump and having a base for rotatably supporting said reel, a saddle bracket for mounting said reel base on said curved upper surface of said tank, and said saddle bracket having a horizontal platform secured to said hose reel base and attached centrally thereof to said upper surface of said tank, and having a plurality of feet attached to each of the opposite ends of said platform and extending toward and standing upon said upper surface.

2. The distribution system of claim 1 wherein said tank has a threaded ventilation cap fitting nipple extending from the top thereof and a ventilation cap threaded onto said ventilation fitting nipple, and wherein said horizontal platform of said saddle bracket has central thereof a hole adapted to surround said fitting nipple for connecting said hose reel to said tank.

3. The distribution system of claim 1 wherein said saddle bracket is formed separate from said reel base and wherein said platform has near each of the opposite ends thereof a flat supporting surface bolted to the bottom of said reel base.

4. The distribution system of claim 1 wherein each of said feet of said saddle bracket is adjustably attached to said platform to extend downwardly therefrom and rest firmly against, and to level, said platform upon said curved upper surface of said tank.

5. The distribution system of claim 1 wherein said saddle bracket is generally U-shaped.

6. The distribution system of claim 5 wherein said U-shaped saddle bracket is formed separate from said reel base, wherein said platform has, extending upwardly therefrom near each of the opposite ends thereof, a flat supporting surface bolted to the bottom of said reel base, and wherein each of said feet of said saddle bracket is adjustably attached to said platform to extend downwardly therefrom and rest firmly against, and to level, said platform upon said curved upper surface of said tank, and wherein said tank has a threaded ventilation cap fitting nipple extending from the top thereof and a ventilation cap threaded onto said ventilation cap fitting nipple, and wherein said horizontal platform of said saddle bracket has near the center thereof a mounting hole received over said fitting nipple and beneath said fitting cap for connection of said saddle bracket to said tank.

7. A hose reel mounting saddle for attaching a retractable hose reel to the upper curved surface of a conventional oil storage tank in an operative lubrication distribution system wherein said tank has a fitting in the upper surface thereof, said saddle comprising:

a horizontal platform, a plurality of downwardly extending feet attached at the opposite ends of said platform for standing upon and supporting said reel against said upper surface of said tank, and said platform being adapted between the opposite ends thereof for attachment with said fitting to said upper surface.

8. The mounting saddle of claim 7 wherein said tank has a threaded ventilation cap fitting on the top thereof and said fitting includes a ventilation cap threaded onto a nipple of said fitting, and wherein said horizontal platform has therein a hole adapted to surround said fitting nipple for attachment of said hose reel to said tank by the threading of said ventilation cap onto said fitting nipple.

9. The mounting saddle of claim 7 wherein said saddle bracket is formed separate from the base of said hose reel and wherein said platform has near each of the opposite ends thereof and extending upwardly therefrom a flat supporting surface adapted to be bolted to the bottom of said reel base.

10. The mounting saddle of claim 7 wherein each of said feet is adjustably attached to said platform to extend downwardly and rest firmly against, and to level, said platform upon said curved upper surface of said tank.

11. The mounting saddle of claim 7 wherein said saddle is generally U-shaped.

12. The mounting saddle of claim 11 wherein said U-shaped saddle is formed separate from the base of said hose reel, wherein said plaatform has extending upwardly from each of the opposite ends thereof a flat supporting surface bolted to the bottom of said reel base and wherein each of said feet is adjustably attached to said platform and extending downwardly therefrom and resting firmly against said platform to support and level said reel upon said curved upper surface of said tank, and wherein said tank has a ventilation cap fitting on the top thereof, said fitting including a ventilation cap threaded onto said a nipple of said fitting, and wherein said horizontal platform of said saddle has near the center thereof a mounting hole adapted to surround said fitting nipple beneath said fitting cap for attachment of said saddle to said tank.

* * * * *